Figure 1:
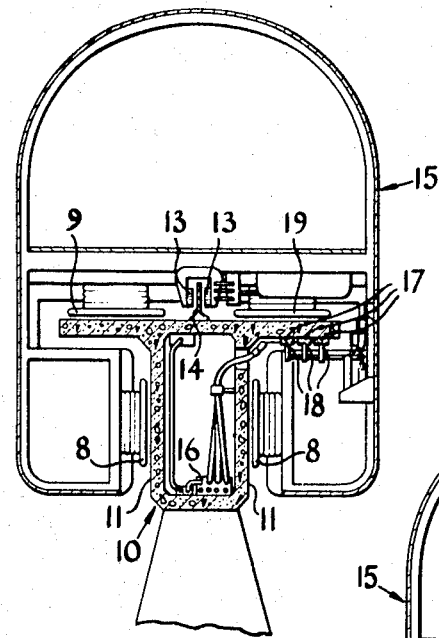

United States Patent

[11] 3,631,809

[72] Inventors Albert Benjamin John Reece;
Harry Rodney Heap, both of Stafford, England
[21] Appl. No. 833,023
[22] Filed June 13, 1969
[45] Patented Jan. 4, 1972
[73] Assignee Tracked Hovercraft Limited
London, England
[32] Priority June 26, 1968
[33] Great Britain
[31] 30,593/68

[54] LINEAR INDUCTION MOTOR BAIL
5 Claims, 3 Drawing Figs.
[52] U.S. Cl. .................................................. 104/148LM,
104/23 FS, 238/150, 310/13, 318/87
[51] Int. Cl. ............................................. B60l 13/00,
E01b 25/00
[50] Field of Search .......................................... 238/150;
104/23 FS, 148 LM, 148, 134; 310/13, 211;
318/87

[56] References Cited
UNITED STATES PATENTS

| | | | |
|---|---|---|---|
| 2,400,192 | 5/1946 | Coons | 310/211 |
| 2,405,012 | 7/1946 | Bousky | 310/211 |
| 3,233,559 | 2/1966 | Smith et al. | 104/148 LM |
| 3,465,181 | 9/1969 | Colby et al. | 310/211 |
| 1,511,111 | 10/1924 | Critchett | 238/150 |
| 3,356,041 | 12/1967 | Bliss | 104/23 FS |
| 3,385,228 | 5/1968 | Chung | 104/134 |

Primary Examiner—Drayton E. Hoffman
Assistant Examiner—Richard A. Bertsch
Attorney—Cameron, Kerkam and Sutton ABSTRACT: A rail for a linear induction motor is formed of nonmagnetic manganese steel alloy which is found to satisfy the requirements for a good linear motor rail. In particular it has a sufficient resistivity to produce a high starting thrust and is hard enough for the application of friction brakes. The rail is shown used for a high-speed tracked air cushion vehicle.

PATENTED JAN 4 1972 3,631,809

LINEAR INDUCTION MOTOR RAIL

This invention relates to linear induction motors and particularly to the rotor or rail of a linear motor.

In a linear induction motor propelled track-guided vehicle such as is described in U.S. Pat. No. 3,356,041 the stator of the linear motor is carried on the vehicle and is in two halves which straddle an elongated rotor in the form of a rail extending along the track.

This invention stems from the realization that the selection of the material for the rail poses a difficult problem because it has to satisfy several different and conflicting requirements.

Firstly, the material has to be nonmagnetic (a) to provide the best performance characteristic and (b) since otherwise the stator will be magnetically attracted to the rail. Secondly, the material has to be reasonably inexpensive, since considerable quantities are required for a linear induction motor propelled vehicle such as a train. Thirdly, the material needs to be reasonably hard and wear-resistant, since it may be used for braking, at least in emergency. Fourthly, it must be capable of conducting electricity, but have high enough resistivity to produce high starting thrust at standstill particularly if the motor is fed from a fixed frequency supply. Fifthly, it must be capable of being formed into long lengths of the section required for a linear motor rail.

Its strength and wearing properties must be such that not only can it support itself under the mechanical and thermal stresses involved, but it must also not wear out rapidly when friction braking is employed.

Very few materials satisfy all these requirements, but one material has been found to be outstanding in meeting these requirements.

Therefore, in accordance with this invention, a rotor or rail for a linear induction motor has at least part of its length formed at least in part of substantially nonmagnetic manganese steel alloy. Manganese steel alloy of eleven to fourteen percent manganese, is preferable. A wide range of other manganese alloys is available however, ranging from 8 to 20 percent manganese content, and with additions of other alloying elements. The main disadvantage of these alloys is their greater cost as compared with 11 to 14 percent manganese steel.

In accordance with another aspect of the invention there is a combination of a linear induction motor propelled vehicle and a track for a track-guided vehicle having a linear induction motor rail formed of nonmagnetic manganese steel alloy extending along at least part of its length.

Figure 2:
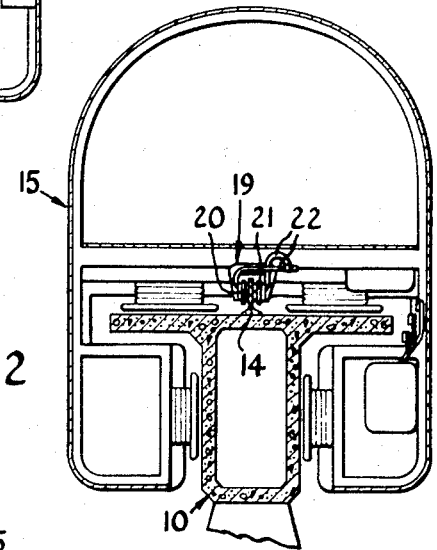
Figure 3:
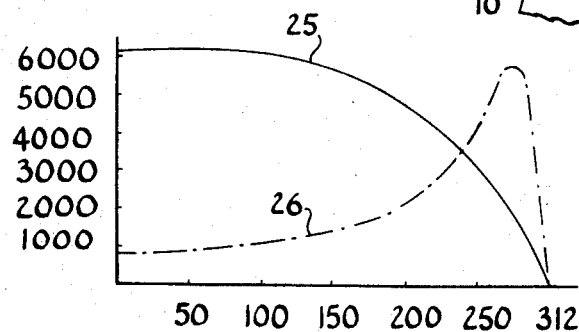

In the accompanying drawings:

FIGS. 1 and 2 are sections through different portions of a tracked air cushion vehicle capable of operating at high speed of the general type described in the above-mentioned patent specification, but embodying the present invention, and FIG. 3 is a graph of thrust in pounds plotted against speed in miles per hour for a given linear motor stator using a rail according to the invention and an aluminum rail.

In FIG. 1 is shown a track 10 on which a hovertrain, or tracked air cushion vehicle 15 is supported by hoverpads 9. Further hoverpads 8 guide the vehicle in a lateral sense, cooperating with the substantially vertical surfaces 11 of the track.

The vehicle 15 is propelled by a linear motor 12 which has a pair of opposed stator parts 13, straddling a rotor or linear motor rail 14.

The motor is supplied with three-phase alternating current via a junction box 16, and three electric supply rails or conductors 17, contacted by carbon pickups 18 carried by the vehicle.

In FIG. 2 is shown another section through the same vehicle 15, showing one of a pair of air-operated brakes 19, mounted one at each end of the vehicle. The brakes have friction pads 20 and 21 which engage the rail 14 when compressed air is supplied through pipes 22.

Nonmagnetic manganese steel alloy has been found to have sufficiently good wear characteristics to withstand the heavy braking pressures, frictional forces and heat generated. Its high resistivity gives good thrust speed characteristics when the linear motor is operated from a fixed frequency supply.

In operation the vehicle is propelled by the linear motor, and it is supported on air cushions. Consequently, braking presents a problem, particularly emergency braking in the event of current failure. The air-operated brakes would be used in an emergency, and would also be used to hold the vehicle still on an incline when the motor is switched off.

FIG. 3 shows thrust speed curves for a given fixed frequency linear motor having a synchronous speed of 312 m.p.h. The solid line indicated by 25 shows the thrust produced by a manganese steel rail. The chain dotted line shows the thrust produced by an aluminum rail. The thrust produced by the manganese steel rail is greater than that produced by the aluminum rail up to a speed of about 240 m.p.h. Manganese steel is therefore particularly useful for a track where the vehicle starts and stops frequently.

We claim:

1. A linear induction motor reaction rail adapted to carry induced electrical currents formed at least in part of a conductive, substantially nonmagnetic manganese steel alloy containing from 8 to 20 percent manganese.

2. A rail as claimed in claim 1 in combination with a track for a track-guided vehicle, the rail extending along at least a part of the length of the track.

3. A track for a track-guided vehicle having a linear induction motor reaction rail adapted to carry induced electrical currents formed of a conductive, substantially nonmagnetic manganese steel alloy containing from 8 to 20 percent manganese extending along at least a part of its length, in combination with a track-guided vehicle for travelling along said track, said vehicle including a linear induction motor stator for cooperating with said rail.

4. The combination of a vehicle and a track as claimed in claim 3 in which the vehicle includes a friction brake to engage said rail.

5. A rail as claimed in claim 1 in which the manganese steel alloy contains from 11 to 14 percent manganese.

* * * * *